June 7, 1932.  W. GRAMS  1,862,304
TOOL SUPPORT FOR CULTIVATORS
Filed Feb. 13, 1930  2 Sheets-Sheet 1
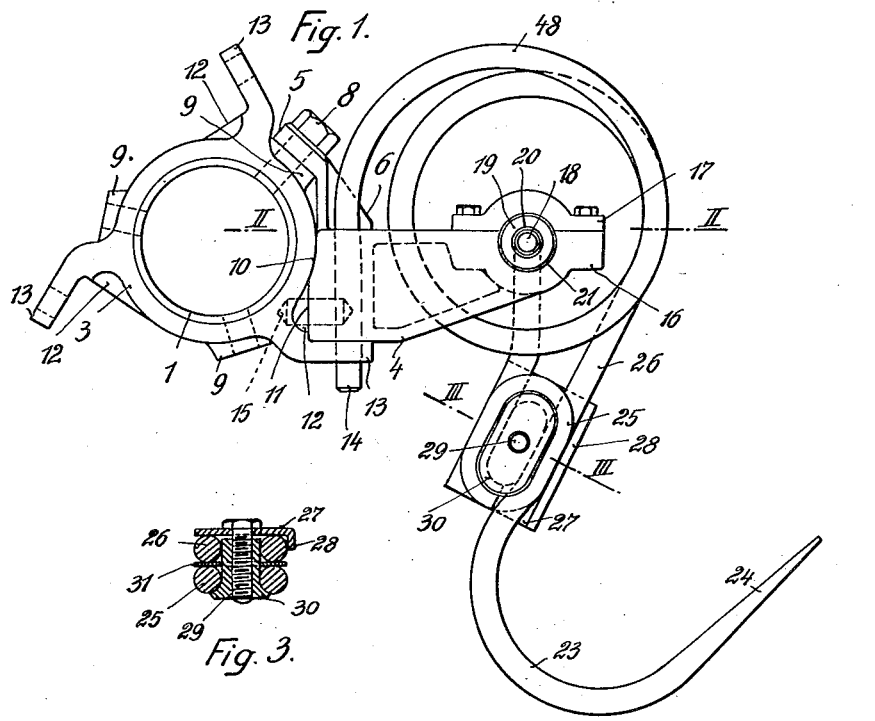
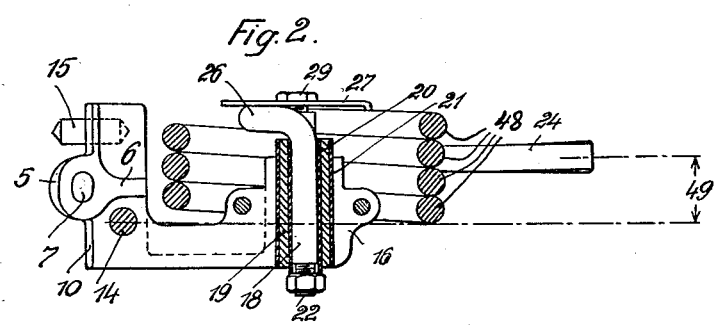
Inventor:
Wilhelm Grams
by
Atty.

June 7, 1932. W. GRAMS 1,862,304

TOOL SUPPORT FOR CULTIVATORS

Filed Feb. 13, 1930 2 Sheets-Sheet 2

Inventor:
Wilhelm Grams
by
Atty.

Patented June 7, 1932

1,862,304

UNITED STATES PATENT OFFICE

WILHELM GRAMS, OF SYDOWWIESE, GERMANY

TOOL SUPPORT FOR CULTIVATORS

Application filed February 13, 1930, Serial No. 428,129, and in Germany November 10, 1927.

My invention relates to cultivators and more particularly to tool supports for cultivators of the general type described in my copending application for patent of the United States Ser. No. 277,929, filed January 19, 1928. Cultivators of this type are equipped with rotary cutting tools or tines which are acted upon by coiled springs.

It is an object of my invention to improve a cultivator of this type. To this end I allot to each tine a single spring which is wound in space, i. e., a spring which may be coiled either parallelly or helically, but it is not flat like a spiral spring. The tine is connected with one end of the spring while its other end is anchored at the tine shaft.

In the device described in the copending application mentioned above, each tine is combined with a pair of coiled springs, one at either side thereof, these springs being wound in opposite directions i. e., one of the springs being right-handed, the other one left-handed.

Providing two springs per tine in this manner involves drawbacks as the space available for the two springs between two tines, measured in parallel relation with the tine shaft, is small. This space is limited by practical considerations, as the pitch of the tines must not overstep a certain limit, otherwise the ground would not be divided finely enough. The pitch determined by this consideration is too small for the reception of two springs of opposite hands, provided that the wire section of the springs is large enough. As this condition cannot be fulfilled, the wire section of the springs was of necessity too small and the springs were subject to early failure. This drawback is eliminated according to the present invention by providing a single spring only for each tine which spring is wound in the same direction.

Each spring is anchored at the tine shaft in any suitable manner, being for instance inserted in a hole with one end, or clamped by any suitable means, and is wound and arranged with respect to all adjacent parts in such manner, that the coils of the spring are spaced from all such parts, so that the spring will nowhere come into frictional contact with other parts when being subjected to tension or allowed to assume its initial form. This is very important as friction rapidly wears these springs.

In the drawings affixed to this specification and forming part thereof several types of cultivators embodying my invention are illustrated diagrammatically by way of example.

In the drawings:

Fig. 1 is an elevation, showing the tine shaft of the cultivator and one of its springs with a tine, Figs. 2 and 3 are sections on the lines II—II and III—III in Fig. 1, respectively.

Figure 4:
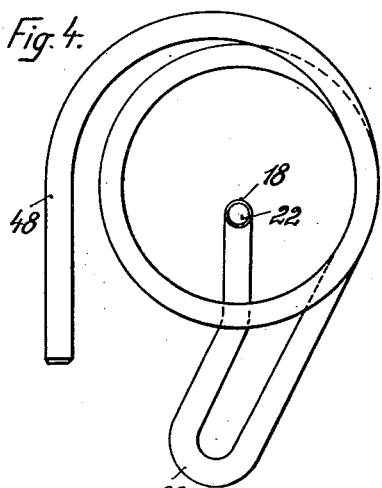
Fig. 4 shows the spring and

Referring now to the drawings and first to Figs. 1–5, 1 is the tine shaft, which is here shown by way of example as having the form of a tube, 3 is a bracket which is bored for the reception of the tine shaft and is held on the shaft by means of three screws 8, only one of which has been shown. 4 is one of three arms which are secured to the bracket. The arm 4 is equipped with an eye 5 which is braced on the arm by a rib 6, and has a hole 7 for the reception of the corresponding screw 8. 9, 9 are bosses for the reception of the three screws, the eyes 5 being supported on the corresponding bosses. The inner end of the arm 4 is recessed at 10 to fit the bracket 3. Below this circular recess the arm has a vertical part 11, which abuts against a face 12 on the bracket 3. 13, 13 are eyes which extend between each boss 9 and each face 12, these eyes being adapted for receiving the end 14 of the tine spring 48, the end being inserted through a bore in the arm 4. 15 is a pin projecting inwardly from the arm 4 at the side opposite the bore for the end 14 of the spring, which pin fits a hole in the bracket 3. By these means each arm 4 is positively secured to a bracket 3.

16 is a bearing at the outer end of the arm 4, 17 is its cap and 18 is the other end of the spring which, as best seen in Fig. 2, is re-bent into the axis of the spring. 19 is a sleeve of soft rubber or some other elastic material, and 20 and 21 are bushings inserted between the end 18 and the sleeve 19, and the sleeve and the spring, respectively. In this manner the spring 48 is anchored in the arm 4 by its end 14, and in the bearing 16 by its end 18. Friction and chattering of the end 18 in the bearing 16 are prevented by the sleeve 19. The bushing 20 is held in position on the end 18 by a threaded extension 22, on the end of which a nut bearing on the sleeve 20 is secured.

Figure 5:
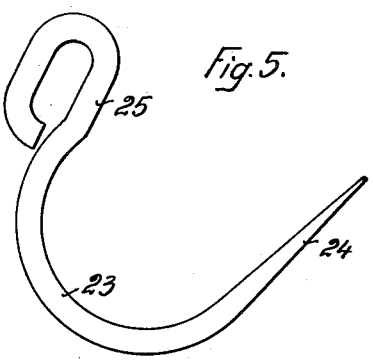
Fig. 5 shows the tine separately.

23 is the tine which is a separate part, as best seen in Fig. 5, so that it may be exchanged when worn, the spring 48 lasting longer than the tines. 24 is the pointed end of the tine and 25 is an eye at the opposite end of the tine, this eye 25 being adapted to be secured on a loop 26 of the spring 48, as best seen in Fig. 4. The loop 26 and the eye 25 are connected by the fixture illustrated more particularly in Fig. 3 and comprising a base plate 27, which is wide enough to bear on the two shanks of the loop 26, and is provided with a flange 28 for engaging the outer face of the loop. 31 is a washer inserted between the loop 26 and the eye 25, 29 is a stud-screw which is inserted in a hole of the base plate 27, and 30 is a nut on the screw 29 which is adapted to engage between the shanks of the loop 26 and the eye 25, and is flanged at its outer end so as to bear on the shanks of the eye 25. The tine 23 is thus reliably fixed to its spring, the washer 31 preventing crushing of the parts, but at the same time the tine is readily exchangeable.

As viewed in Fig. 1, the eye 25 of the tine 23 is in front of the loop 26, which reduces to a minimum the leverage 49 from the end 14 of spring 48 to the point 24 of the tine as shown in Fig. 2. If the eye 25 were secured to the outside, i. e. at the rear of the loop 26 as viewed in Fig. 1, the leverage 49 would become undesirably long.

Figure 6:
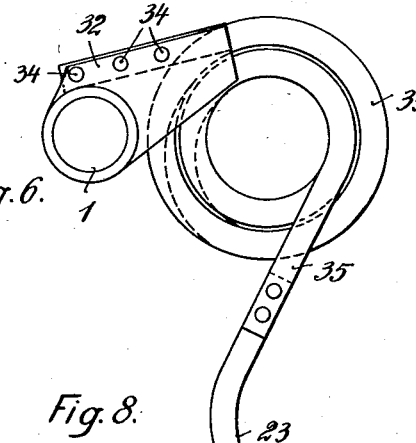
Fig. 6 is an end elevation.
Figure 7:
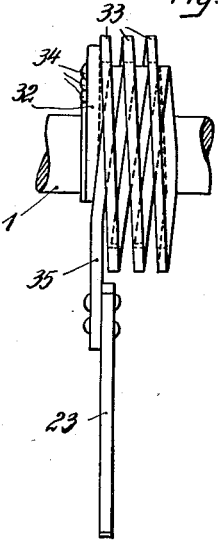
Fig. 7 is a side elevation of a tine shaft with a spring having two coaxial windings.

Referring now to Figs. 6 and 7, 1 is the tine shaft as described, 31 is a bracket on the shaft, 34 are screws or other elements for securing to the bracket the end of the spring, and 32 is the spring, which here consists of two coaxial windings of equal hand inserted one within the other. 35 is the end of the inner winding, to which the tine 23 is secured by rivets or some other suitable means. A spring of this type combines considerably effective length and large wire section with short over-all length.

Figure 8:
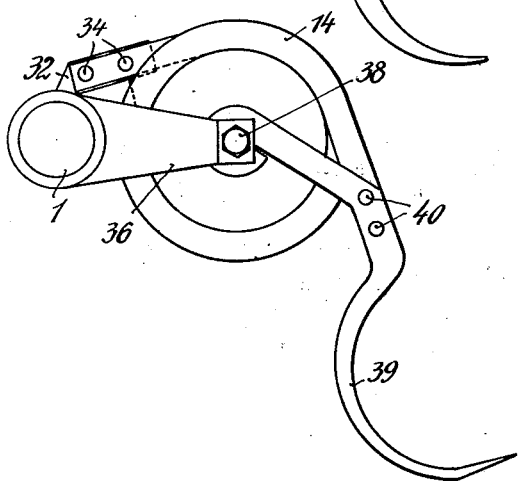
Fig. 8 is an end elevation and Figure 9:
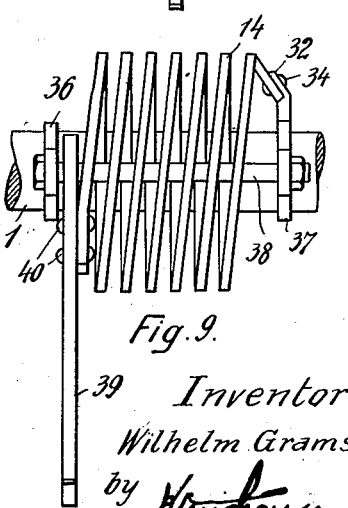
Fig. 9 is a side elevation of a tine shaft with a spring, the tine of which is fitted to rock about a shaft extending in parallel to the tine shaft.

Referring now to Figs. 8 and 9, the inner end of the spring 14 is secured to the tine shaft 1 by a bracket 32 and screws or rivets 34 as described with reference to Figs. 6 and 7. The spring 14 has only a single winding, like the spring 48. 38 is a shaft which extends in parallel relation with the tine shaft 1, and in the axis of the spring, and is held in suitable brackets 36, 37 on the shaft. 39 is a tine which is screwed or riveted to the outer end of the spring 14 at 40 and is provided with an eye at its rear end by which it is fitted to rock about the shaft 38. The general arrangement of this tine is similar to that illustrated in Figs. 4—5, the distinction being that the tine itself, and not the loop 26 to which the tine is secured, is fitted to rock about an axis.

Obviously, a spring as illustrated in Figs. 6 and 7 with two coaxial windings, may be provided in connection with the cultivators illustrated in Figs. 1–5 and 8 and 9, instead of a plain spring.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A tool support for cultivators having rotary cutting tools or tines and comprising a tine shaft, a spring wound in space and in a single direction only, said spring being anchored to said tine shaft at one end and being so designed and arranged with respect to adjacent parts as to eliminate frictional contact with such parts, a loop at the other end of said spring, an extension on said loop which is re-bent longitudinally into said spring, a bearing for said extension on said tine shaft, and a tool adapted to be attached to said loop.

2. A tool support for cultivators having rotary cutting tools or tines and comprising a tine shaft, a spring wound in space and in a single direction only, said spring being anchored to said tine shaft at one end and being so designed and arranged with respect to adjacent parts as to eliminate frictional contact with such parts, a loop at the other end of said spring, an extension on said loop which is re-bent longitudinally into said spring, a bearing for said extension on said tine-shaft, a layer of resilient material inserted between said extension and said bearing, and a tool adapted to be attached to said loop.

3. A tool support for cultivators having rotary cutting tools or tines and comprising a tine shaft, a bracket on said tine shaft, an arm on said bracket, a spring wound in space and in a single direction only, said spring being anchored in said arm and in said bracket at one end and being so designed and arranged with respect to adjacent parts as to eliminate frictional contact with such parts, a loop at the other end of said spring, an extension on said loop which is re-bent longitudinally into said spring, a bearing for said extension on said arm, and a tool operatively connected with the other end of said spring.

4. A tool support for cultivators having rotary cutting tools or tines comprising a tine shaft, a spring anchored to said tine shaft at one end, a tool connected to the other end of said spring, an arm extending from said shaft to said spring and forming an abutment for said spring, and a layer of an elastic material intermediate said spring and said arm.

5. A tool support for cultivators having rotary cutting tools or tines comprising a tine shaft, a spring anchored to said tine shaft at one end, a tool connected to the other end of said spring, an arm extending from said shaft to said spring and forming an abutment for said spring, and a rubber sleeve intermediate said spring and said arm.

6. A tool support for cultivators having rotary cutting tools or tines comprising a tine shaft, a spring anchored to said tine shaft at one end, a tool connected to the other end of said spring, an extension on said tool, a bearing for said extension on said shaft and a layer of an elastic material between said extension and said bearing.

In testimony whereof I affix my signature.

WILHELM GRAMS.